W. LAUHOFF.
MACHINE FOR TRIMMING OR SMUTTING WHEAT, &c.
No. 10,451. Reissued Feb. 26, 1884.
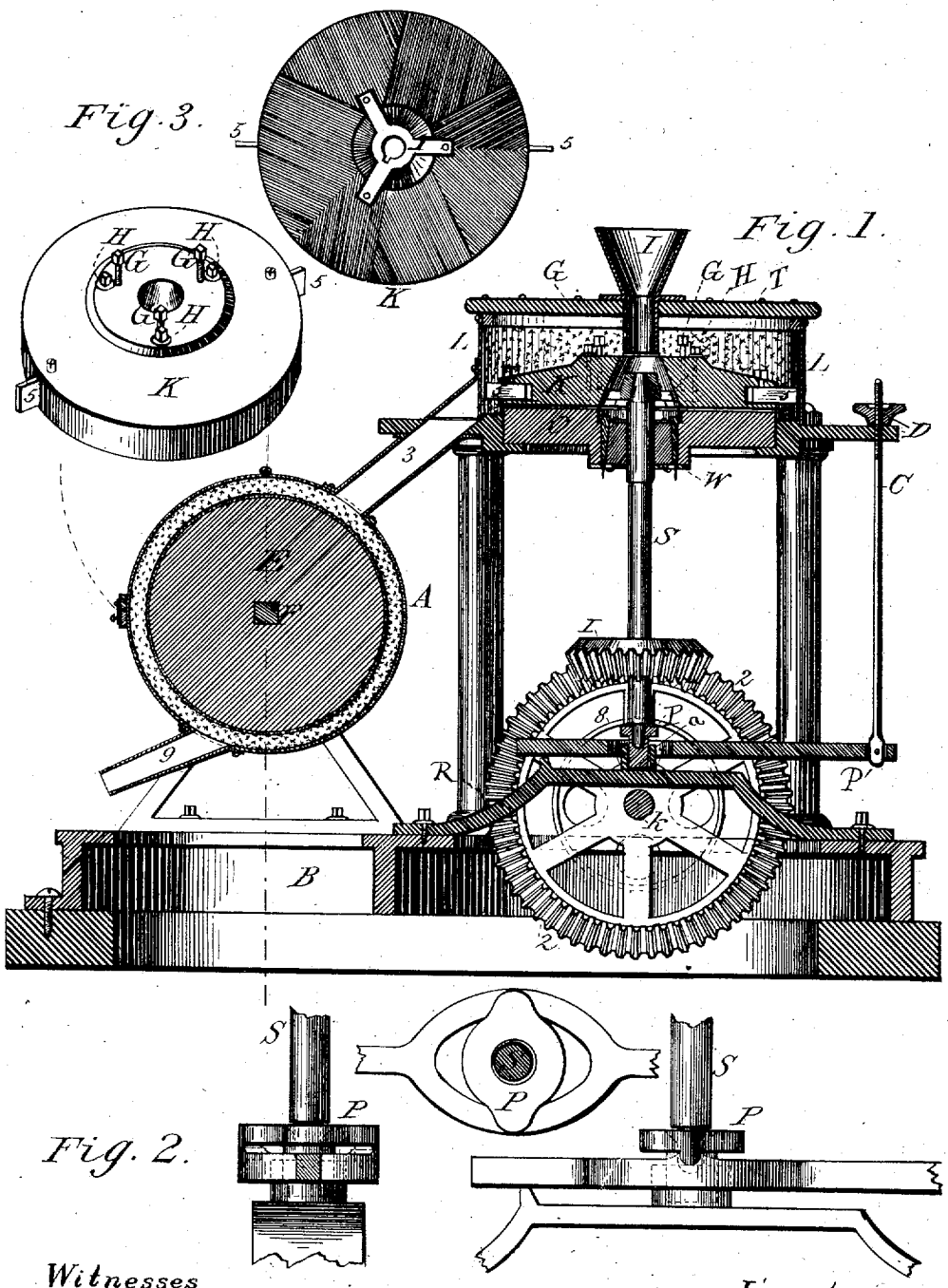
Witnesses
Samuel T. Thomas.
J. Edward Warren
Inventor
William Lauhoff
By W. W. Leggett
Attorney
N. PETERS, Photo-Lithographer, Washington, D. C.

W. LAUHOFF.

MACHINE FOR TRIMMING OR SMUTTING WHEAT, &c.

No. 10,451. Reissued Feb. 26, 1884.

Witnesses
Samuel C. Thomas.
J. Edward Warren

Inventor
William Lauhoff
By W. W. Leggett
Atty.

N. PETERS. Photo-Lithographer, Washington, D. C.

UNITED STATES PATENT OFFICE.

WILLIAM LAUHOFF, OF DETROIT, MICHIGAN.

MACHINE FOR TRIMMING OR SMUTTING WHEAT, &c.

SPECIFICATION forming part of Reissued Letters Patent No. 10,451, dated February 26, 1884.

Original No. 230,138, dated July 20, 1880. Application for reissue filed May 22, 1882.

*To all whom it may concern:*

Be it known that I, WILLIAM LAUHOFF, of Detroit, in the county of Wayne and State of Michigan, have invented certain new and useful Improvements in Machines for Trimming or Smutting Wheat, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to certain improvements in that class of machines which trim the ends of wheat or rye and remove them, together with smut, dirt, and other impurities which may be mixed with the grain; and the invention consists in novel features of construction and combination and arrangement of parts, as will be hereinafter fully described, and pointed out in the claims hereto annexed.

Figure 4:
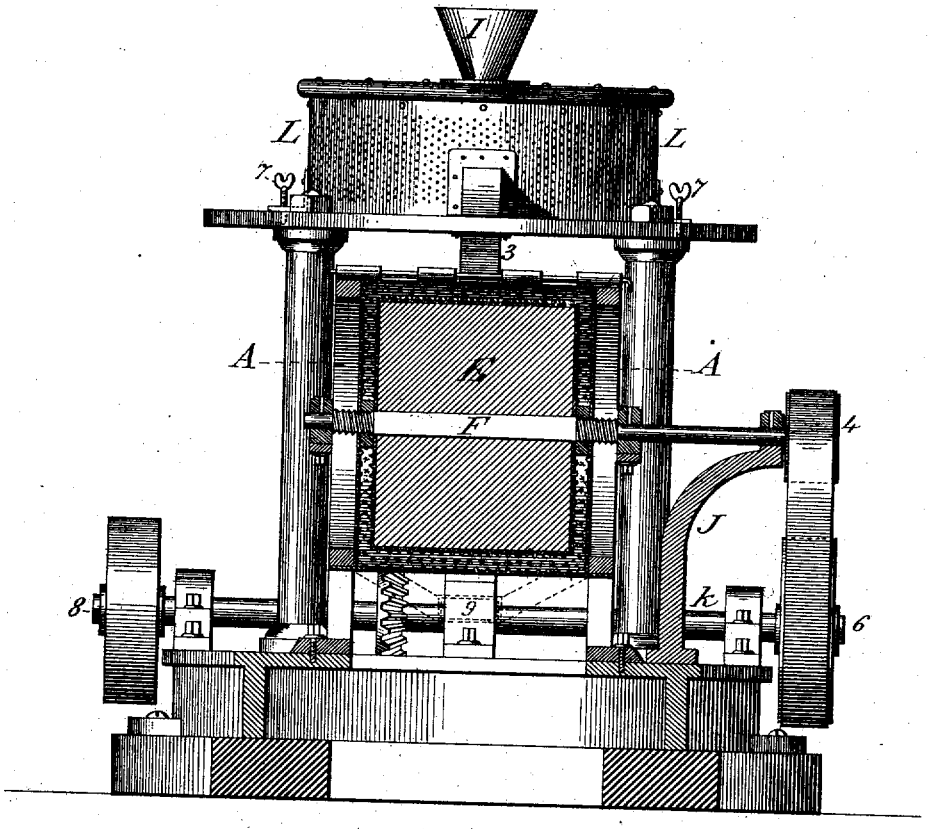
Figure 5:
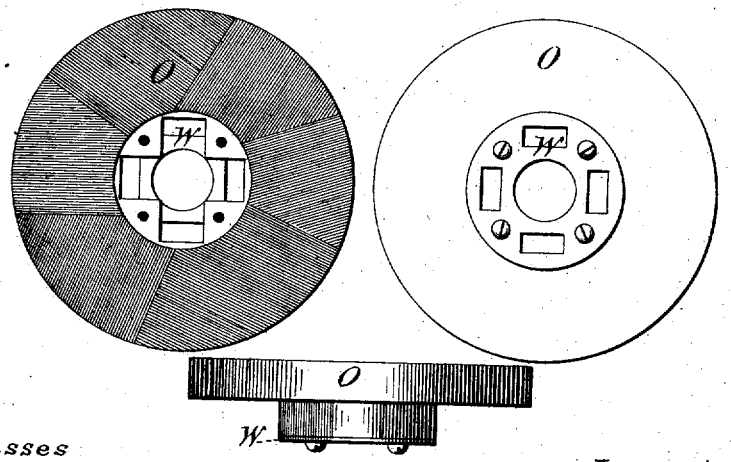

In the drawings, Figure 1 is a vertical central section of the machine. Fig. 2 represents in different views the detail parts of the lower bearing of the vertical spindle. Fig. 3 represents, respectively in plan and reverse plan views, the upper or revolving stone. Fig. 4 is a rear end view of the machine, showing the polishing-cylinder in longitudinal vertical section. Fig. 5 represents in different views the lower or stationary stone.

The case L, which incloses the upper and lower stones, K and O, has its inner vertical side formed as a grating-surface, the same being made by puncturing holes in the metallic side of the case. The upper or revolving stone, K, has its periphery provided with one or more radial slots, in which fit slides 5, the latter being adapted to be maintained in adjusted position with relation to the surrounding-case L by set-screws, which have end bearing against the upper edges thereof, the object of said slides being to agitate and throw the grain against the inner punctured side of the surrounding case to remove the dirt therefrom, and also carry it around to the discharge-spout leading to the polishing-machine. A driver, T, having triangular arms, is located in the central opening of the stone, and its arms fit in suitable recesses formed in the under side of the stone. An outer set of vertically-adjusting screws, H, pass through the stone, and have screw-thread engagement with the driver-arms. An inner set of vertically-adjusting screws, G, pass through the stone, and have end bearing against the upper surface of the arms. If one side of the stone is too high, the outer adjusting-screw near that portion of the stone is turned down, so as to level the stone. The corresponding inner adjusting-screw is then run down, so as to bear strongly against the driver-arm, and thereby maintain the stone firmly in position. If one side of the stone is too low, the inner adjusting-screw at that portion of the stone is run up, and then the outer adjusting-screw is turned up, so as to raise the stone the desired distance. The inner adjusting-screw is then run down, so as to bear strongly against its driver-arm. The driver is firmly fitted on the upper extremity of the vertical spindle S by a conical bearing, so as to prevent all accidental displacement. The lower or stationary stone is provided with a central opening, through which the spindle passes. The stones, it will be observed, along their opposing surfaces are flat, so that the stones stand, when properly adjusted, at the same distance apart throughout their entire grinding-surfaces. They are, moreover, dressed with a uniform dressing from their centers to their peripheries, the dressing being formed in the nature of close file cuttings, as shown in Figs. 3 and 5, so that the action upon the grain will be uniform from the centers to the peripheries. The bush-blocks are adjusted against the spindle by wedges interposed between the bushing and the side of the opening. A metallic plate, W, is secured to the under side of the stone and maintains the bushing in position. The lower end of the spindle is stepped in a bridge-pot, P, having lateral arms, which engage with the lever P′ as the latter is vertically adjusted by rod C and nut D. This lever is provided with a slot, which fits over the socket *a* of arch R, said socket having the bridge-pot fitted therein. The opposing surfaces of the sides and ends of horizontal rotary cylinder E and inclosing-case A are formed as grating-surfaces, the same being made by holes punctured in the metal, so as to cause said surfaces to serve as graters. The wheat or rye is first delivered to the machine by hopper I, and it is acted upon by the two horizontal stones, the latter being relatively adjusted to cause the grain to travel upright between said stones, due to the centrifugal force or action of the movable stone. The ends of the grain are thereby trimmed, and when properly trimmed and smutted it is discharged through spout 3 into the cylindrical case A. After the grain is finally polished by the action of the grating-surfaces of said case and its cylinder, it is discharged from the machine by spout 9.

Having fully described my invention, what I claim as new, and desire to secure by Letters Patent, is—

1. The combination, with an upper horizontal stone, provided with a radial slot having closed longitudinal walls, of a slide which fits in the slot and a set-screw which engages with the upper edge of the slide, substantially as described.

2. In a machine for trimming wheat, the combination of a pair of suitably-dressed stones for ending up and trimming the wheat, an inclosing-case for said stones, having an interior grated surface, and means for carrying the grain around and throwing it against the grated interior surface of said case, substantially as described.

In testimony whereof I sign this specification in the presence of two witnesses at Detroit, Michigan.

WILLIAM LAUHOFF.

Witnesses:
J. EDWARD WARREN,
JOSEPH LAUHOFF.